US006202696B1

(12) United States Patent
McPherson, Jr. et al.

(10) Patent No.: US 6,202,696 B1
(45) Date of Patent: Mar. 20, 2001

(54) VOLTAGE BLOCKS

(75) Inventors: Jerry L. McPherson, Jr., Greenfield, IN (US); Ghaffar Kazkaz, Rolling Meadows; Lee A. Sheridan, Barrington, both of IL (US); Roy E. Young, II, Avon, IN (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/458,910

(22) Filed: Dec. 10, 1999

(51) Int. Cl.[7] .................................................. F16K 11/02
(52) U.S. Cl. ...................................... 137/625.47; 251/368
(58) Field of Search .............................. 137/625.47, 560; 251/368

(56) References Cited

U.S. PATENT DOCUMENTS 5,221,194 * 6/1993 Konieczynski et al. ............. 417/430
5,494,258 * 2/1996 Weissgerber et al. ............... 251/368
5,787,928 * 8/1998 Allen et al. ...................... 137/625.43
5,944,045 * 8/1999 Allen et al. .......................... 137/240

* cited by examiner

Primary Examiner—John Fox
(74) Attorney, Agent, or Firm—Barnes & Thornburg

(57) ABSTRACT

A valve has a housing and a component movable within the housing. The housing has first, second and third ports formed in it. The movable component has a first passageway formed in it. Movement of the movable component within the housing selectively connects the first port through the first passageway to the second port, or the second port through the first passageway to the third port. At least one of the first and second ports includes a first member for contacting the movable valve component and a second member for retaining the first member. The second member may be constructed from a semiconductive material. At least a region of the movable component around a first end of the first passageway may be semiconductive.

28 Claims, 3 Drawing Sheets

VOLTAGE BLOCKS

FIELD OF THE INVENTION

This invention relates to improvements in systems of the general type described in, for example, U.S. Pat. Nos. 5,632,816; 5,746,831; 5,787,928; and 5,944,045. However, the invention is believed to be useful in other applications as well. The disclosures of U.S. Pat. Nos. 5,632,816; 5,746,831; 5,787,928; and 5,944,045 are hereby incorporated herein by reference.

BACKGROUND OF THE INVENTION

Many voltage blocks are illustrated and described in the prior art. There are, for example, the voltage blocks illustrated and described in U.S. Pat. Nos. 4,878,622; 4,982,903; 5,033,942; 5,154,357; and 5,193,750, and the references cited in those patents, particularly including U.S. Pat. Nos. 1,655,262; 2,547,440; 2,673,232; 3,098,890; 3,122,320; 3,291,889; 3,893,620; 3,933,285; 3,934,055; 4,017,029; 4,020,866; 4,085,892; 4,275,834; 4,313,475; 4,383,644; and, 4,413,788, and U.K. Patent Specifications 1,393,333 and 1,478,853. Also of interest are U.S. Pat. Nos. 2,814,551; 2,921,604; 3,419,827; 3,450,092; 3,838,946; 4,030,860; 4,232,055; 4,304,252; 4,381,180; 4,386,888; 4,515,516; 4,552,334; 4,741,673; 4,792,092; 4,879,137; 4,881,688; 4,884,745; 4,932,589; 4,962,724; 5,078,168; 5,094,389; 5,096,126; 5,102,045; 5,102,046; 5,105,851; 5,197,676; 5,244,012; 5,249,748; 5,255,856; 5,273,072; 5,288,029; 5,288,525; 5,326,031; 5,340,289; 5,341,990; and, 5,364,035. The disclosures of these references also are hereby incorporated herein by reference. No representation is intended by this listing that this is a complete listing of all pertinent prior art, or that a thorough search of all pertinent prior art has been conducted, or that no better prior art exists. Nor should any such representation be inferred.

It has been found from experience gained from use of voltage blocks constructed as described in, for example, U.S. Pat. Nos. 5,632,816; 5,746,831; 5,787,928; and 5,944,045, that repeated arcing along the seats and ball surfaces of the four-way valves constructed as described in these patents can, in certain circumstances, result in erosion of the seat and ball surfaces. This erosion can lead to increased contamination of the solvent/voltage blocking medium with coating material. This, in turn, can lead to increased use not only of coating material but also of solvent/voltage blocking medium. Increased use of coating material equates with increased coating cost. Increased use of solvent/voltage blocking medium not only increases solvent/voltage blocking medium use and cost, but may also increase use of the molecular sieves used to extract the coating material vehicle from the solvent/voltage blocking medium, with its attendant cost. The impact of these increased usages also includes increased downtime to service systems of the type described in U.S. Pat. Nos. 5,632,816; 5,746,831; 5,787,928; and 5,944,045, in order to replenish their solvent/voltage blocking medium supplies and molecular sieves.

DISCLOSURE OF THE INVENTION

According to one aspect of the invention, a valve has a housing and a component movable within the housing. The housing has first, second and third ports formed in it. The movable component has a first passageway formed in it. Movement of the movable component within the housing selectively connects the first port through the first passageway to the second port. The movable component is selectively movable to disconnect the first port and second port and to connect the second port through the first passageway to the third port. At least one of the first and second ports includes a first member for contacting the movable valve component and a second member for retaining the first member. At least one of the first and second members is constructed at least in part from a semiconductive material. Each of the first and second members includes a passageway providing communication between the at least one of the first and second ports and the movable valve component.

Illustratively according to this aspect of the invention, each of the first and second ports includes a first member for contacting the movable valve component and a second member for retaining the first member. At least one of the first and second members associated with each of the first and second ports is constructed at least in part from a semiconductive material. Each of the first and second members includes a passageway providing communication between a respective one of the first and second ports and the movable valve component.

Further illustratively according to this aspect of the invention, the housing includes a fourth port. The movable component further includes a second passageway. Movement of the movable component within the housing alternately connects the first port and the second port through the first passageway and the third port and the fourth port through the second passageway, and the first port and the fourth port through the second passageway and the second port and the third port through the first passageway. At least one of the third and fourth ports also includes a first member for contacting the movable valve component and a second member for retaining the first member. At least one of the first and second members associated with the at least one of the third and fourth ports is constructed at least in part from a semiconductive material. Each of the first and second members includes a passageway providing communication between the at least one of the third and fourth ports and the movable valve component.

Additionally illustratively according to this aspect of the invention, each of the first, second, third and fourth ports includes a first member for contacting the movable valve component and a second member for retaining the first member. At least one of the first and second members associated with each of the first, second, third and fourth ports is constructed at least in part from a semiconductive material. Each of the first and second members includes a passageway providing communication between a respective one of the first, second, third and fourth ports and the movable valve component.

According to another aspect of the invention, a valve includes a housing and a component movable within the housing. The housing has first, second and third ports formed in it. The movable component has a first passageway formed in it. Movement of the movable component within the housing selectively connects the first port through the first passageway to the second port. At least a first region of the movable component surrounding at least a first end of the first passageway is constructed from semiconductive material. The movable component is selectively movable to disconnect the first port and second port and to connect the second port through the first passageway to the third port.

Illustratively according to this aspect of the invention, a second region of the movable component surrounding a second end of the first passageway is constructed from semiconductive material.

Further illustratively according to this aspect of the invention, the housing includes a fourth port and the movable component further includes a second passageway formed in it. Movement of the movable component within the housing selectively connects the first port through the first passageway to the second port and the third port through the second passageway to the fourth port, or the first port through the first passageway to the fourth port and the second port through the second passageway to the third port. At least a third region of the movable component surrounding at least a first end of the second passageway is also constructed from semiconductive material.

Additionally illustratively according to this aspect of the invention, at least a fourth region of the movable component surrounding a second end of the second passageway is also constructed from semiconductive material.

Illustratively according to this aspect of the invention, the movable component is constructed from semiconductive material.

Illustratively according to the invention, the movable component has a circular cross section and an axis of rotation lying along the center of the circular cross section.

Further illustratively according to the invention, the movable component includes a generally spherically shaped surface.

Additionally illustratively according to the invention, the valve housing is constructed from electrically non-conductive materials. Illustratively, the valve housing is constructed from resins. Further illustratively, the valve housing is constructed from filled resins.

Illustratively according to the invention, the valve housing further includes a fifth port and a sixth port. A third passageway is defined between the housing and the movable component. The fifth and sixth ports are connected to the third passageway.

BRIEF DESCRIPTIONS OF THE DRAWINGS

The invention may best be understood by referring to the following detailed description and accompanying drawings which illustrate the invention. In the drawings.

DETAILED DESCRIPTIONS OF ILLUSTRATIVE EMBODIMENTS

It has been discovered that erosion of the seats that maintain wiping contact with the movable valve components of systems of the type described in U.S. Pat. Nos. 5,632,816; 5,746,831; 5,787,928; and 5,944,045 can be reduced by so designing the seats that they are maintained at substantially uniform electrical potential substantially across their entire surfaces. Illustratively, this can be accomplished by constructing such seats from semiconductive materials, or by mounting such seats in seat holders or seat cups which are constructed from, or coated with, semiconductive materials. The semiconductive material selected should have high enough conductivity to keep potential gradients across the seat or cup surface at or below potential gradients at which the semiconductive material is susceptible to such erosion. As used herein, the term "semiconductive" means electrically more insulative than the term "electrically conductive." Conversely, the term "semiconductive" means electrically more conductive than the term "electrically insulative."

It has also been discovered that erosion of the movable valve components can be improved by providing a semiconductive area generally the same area as the contact area of the facing seat around each end of each of the passageways through the movable valve component. Further it has been discovered that erosion of the movable valve component can be improved by constructing the movable valve component from semiconductive material, such as $10^5$ $\Omega$-m bulk resistivity Delrin® acetal resin.

Figure 1:
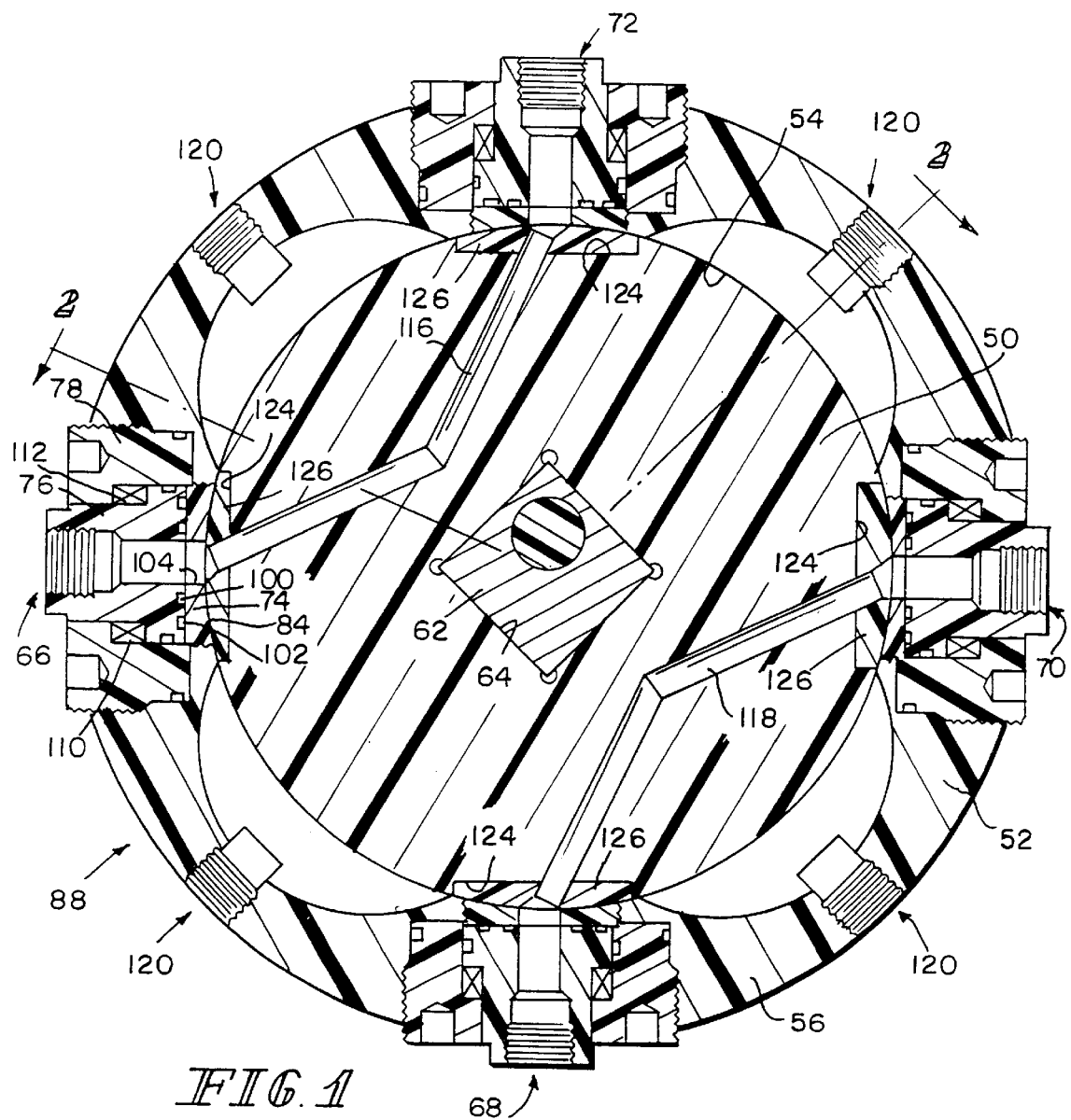
FIG. 1 illustrates a sectional view, taken generally along section lines 1—1 of FIG. 2, through a valve constructed according to the invention.
Figure 2:
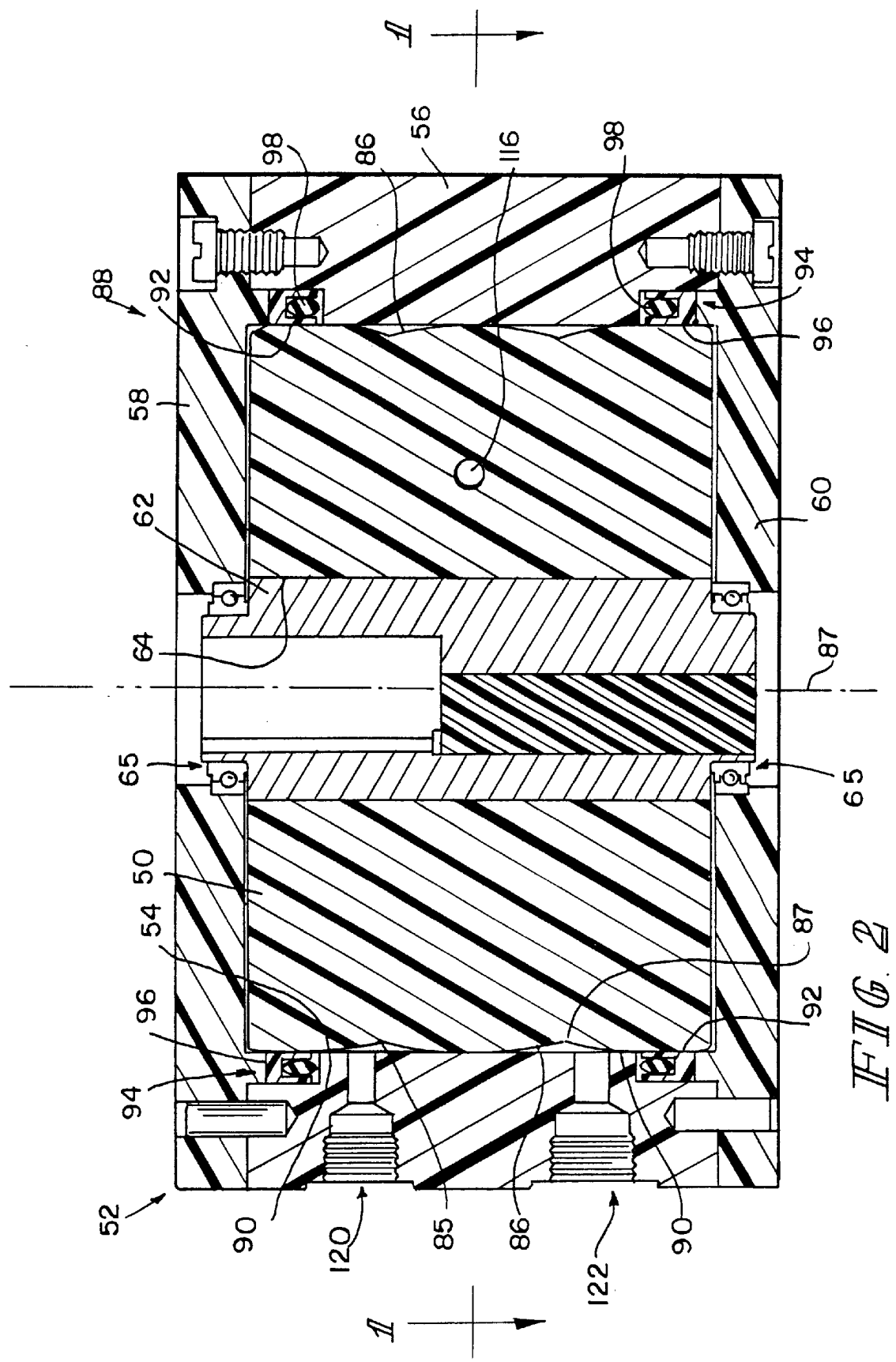
FIG. 2 illustrates a sectional view, taken generally along section lines 2—2 of FIG. 1, through the valve illustrated in FIG. 1; and, FIGS. 3a–b illustrate enlarged sectional views through two alternative details to a detail of the valve illustrated in FIGS. 1–2.

In an embodiment of the invention illustrated in FIGS. 1–2, a somewhat right circular cylindrical, or drum-shaped, four way valve body 50 is rotatably housed in a valve housing 52 having a generally right circular cylindrical interior 54. The housing 52 includes a sidewall portion 56 and two endwall portions 58, 60. A square transverse section drive shaft 62 extends through a complementarily configured passageway 64 provided therefor in body 50. The circular cross section ends of drive shaft 62 are rotatably mounted in endwall portions 58, 60 by suitable bearings 65. Sidewall 56 is provided with four equally circumferentially spaced coating material ports 66, 68, 70, 72, all of which are similarly configured, and so only one of which will be discussed in detail.

Port 66 is defined by a seal 74, a seal retainer 76 and a retainer housing 78. The inner, concave, surface 84 of seal 74 which physically lies against the outer surface of valve body 50 in its central region 86 is a surface of a sphere having a radius equal to the distance from the geometric center of shaft 62 perpendicularly outward from the axis 87 of shaft 62 to the inner surface of sidewall 56. In this embodiment, the seal 74 itself is constructed from semiconductive material. The outer surface of the central region 86 of valve body 50 also is a surface of a sphere having the same radius and centered at the midpoint of the length of axis 87. This is done to facilitate assembly of the valve 88. This configuration also provides a valve seal 74, 84, 86 which is effectively self-lapping. That is, the seal 74, 84, 86 efficiency is not degraded through use, and may, in fact, even improve through operating cycles of the valve 88.

Figure 3B:
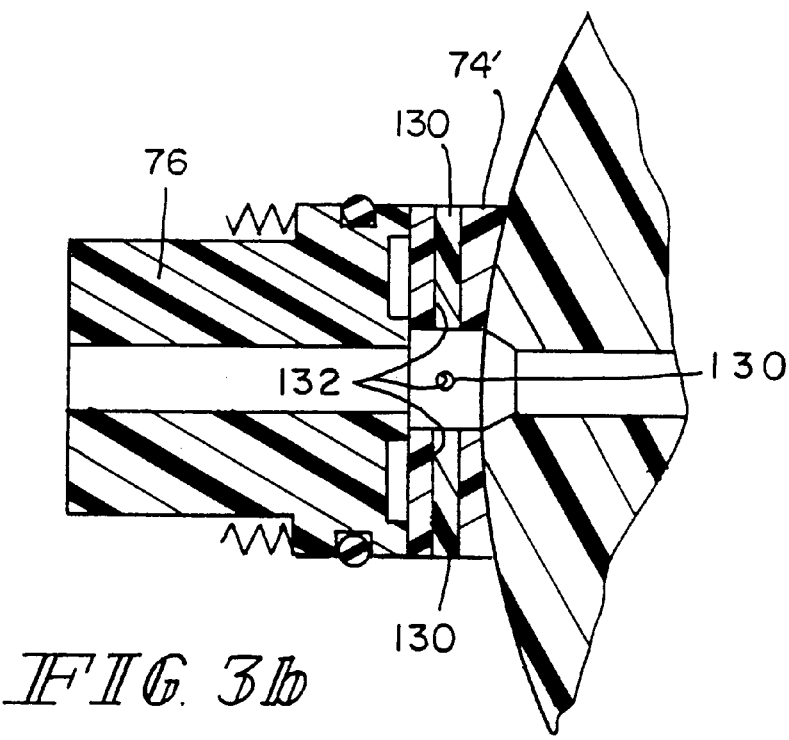
Figure 3A:
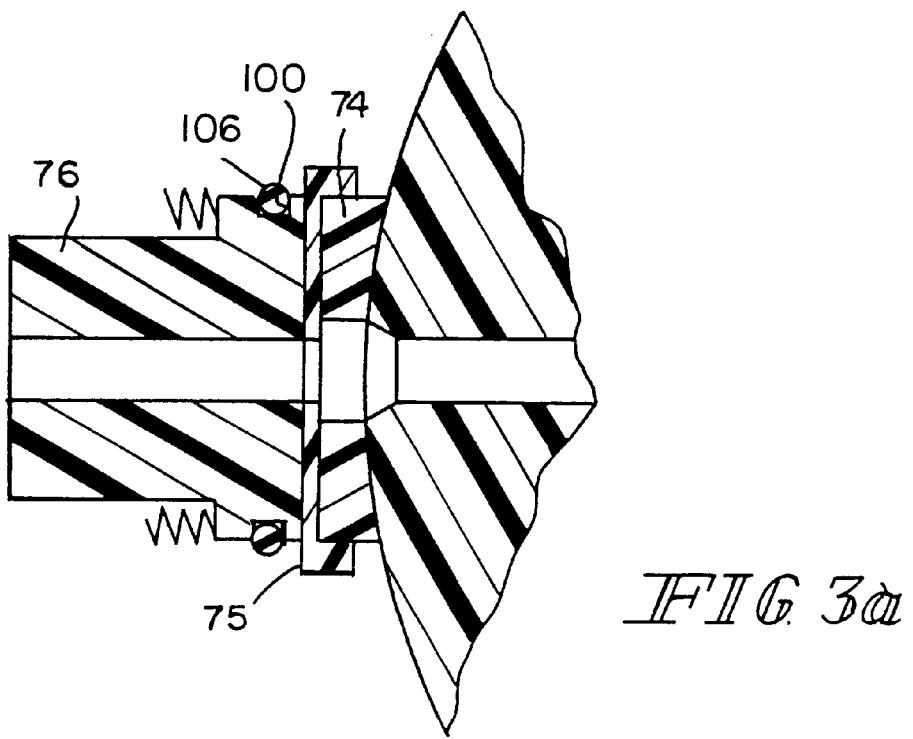

Other embodiments of the seal and seal retainer and retainer housing are illustrated in FIGS. 3a–b. In FIG. 3a, a single O-ring 106 in a groove 100 is provided Around the seal retainer 76. Also, seal 74 is mounted in a semiconductive cup or holder 75 which encloses the back side and part of the sidewall of seal 74. In FIG. 3b, the surface of seal retainer 76 facing the backside of seal 74' is provided with a rectangular cross-section annular void, so that the loading on seal 74' is at its center and around its circumference. The use of semiconductive materials for seals 74 and/or seal cups 75 helps to distribute the electrical energy at the contact area between the seats 74 and the valve body 50, thereby reducing the likelihood of arcing across the contact area between the valve body 50 and the seat 74.

Central region 86 merges beyond surface 84 of seal 74 at grooves 85 and 87 into substantially right circular cylindrical end regions 90 of valve body 50. An annular groove 92 is provided between cooperating surfaces of sidewall portion 56 and each of endwall portions 58, 60. An annular seal 94 comprising, for example, an ultra high molecular weight (UHMW), high density polyethylene (HDPE) jacket 96 of generally U-shape transverse to its circumferential extent, and a circular cross-section Viton® O-ring 98 for holding the jacket 96 in its fully open or spread configuration, is housed in each groove 92.

Referring back to FIG. 1, seal retainer 76 is provided with two grooves 100, 102 concentric with the opening 104 of port 66. An O-ring is provided in each of grooves 100, 102, respectively, to bear against the back surface of seal 74 to seal the port 66 from the space radially outwardly beyond the O-rings in grooves 100, 102. Seal retainer 76 is slidably received in retainer housing 78. A wave spring 110 is positioned in an annular space 112 provided between retainer 76 and housing 78 to urge seal 74 into intimate sealing contact with the central region 86 of valve body 50. Retainer housing 78 is threaded into an opening 114 provided therefor in sidewall 56.

Passageways 116, 118 are provided in valve body 50 selectively to connect circumferentially adjacent ports 66, 68 and 70, 72 or 66, 72 and 68, 70. Sidewall portion 56, endwall portions 58, 60, seal retainer 76 and housing 78 can all be constructed from Delrin® resin or the like, although polyetheretherketone (PEEK) or Torlon® resin or the like may be more suitable for more highly abrasive coating materials, such as mica-based coating materials and the like. Valve body 50 can be constructed from such materials also.

As previously noted, it has been discovered that erosion of the movable valve components may, under certain circumstances, be improved by making at least those areas of the valve body 50 around the ends 66, 68, 70, 72 of the passageways 116, 118 through the valve body 50 of semiconductive material. This may be achieved, for example, by providing a part-spherical semiconductive area of similar area, for example, 1.125 inch (2.86 cm) diameter, to the contact area of the facing seat 74 around each end 66, 68, 70, 72 of each of the passageways 116, 118 through the valve body 50. Illustratively, valve body 50 is provided with reliefs 124 at each end 66, 68, 70, 72 of each of the passageways 116, 118 adjacent surface 86. A semiconductive insert 126 is provided in each relief 124. The outer surfaces of inserts 126 have the same part spherical configurations as surface 86. Inserts 126 are formed from semiconductive material of any of a number of known types, such as carbon-filled Delrin® resin, carbon-filled PEEK resin, carbon-filled Torlon® resin, or the like, filled with carbon to the desired bulk conductivity.

Also as previously noted, it has been discovered that the seats 74 can also be constructed from semiconductive materials or mounted in seat holders or seat cups 75 which are constructed from, or have their surfaces contacting seats 74 coated with, semiconductive materials. For example, seat cups 75 may be constructed from Delrin® resin or the like, and coated with a semiconductive coating such as, for example, electrogrease ELGR8501 silver filled thermally conductive paste available from AIT, 70 Washington Road, Princeton Junction, N.J., 08550. Alternatively, the entire seat 75 can be constructed from a semiconductive resin, such as carbon-filled Delrin® resin, carbon-filled PEEK resin, carbon-filled Torlon® resin, or the like, filled with carbon to the desired bulk conductivity, or Semitron™ ESd 500 resin available from DSM Engineering Plastic Products, Inc., 2120 Fairmont Avenue, Reading, Pa. 19612-4235 or the like. As another alternative, pins 130 of such a semiconductive resin can be inserted into radially extending bores 132 provided in the seats 74' themselves. See FIG. 3b.

Solvent/voltage blocking medium inlet 120 and outlet 122 port pairs are provided in sidewall portion 56. Circumferentially of sidewall portion 56, the port pairs 120, 122 are equidistantly spaced between adjacent coating material ports 66, 68, 70, 72. However, axially of sidewall portion 56, ports 120 are offset toward endwall portion 58 and ports 122 are offset toward endwall portion 60. The ports 120, 122 open into the interior 54 of housing 52 at the locations of grooves 85, 87 on valve body 50. This configuration permits the solvent/voltage blocking medium to wash continuously across the region 86 between ports 120 and 122 and flush away any coating material residue on the surface of region 86 as the valve 88 operates.

Port 66 is coupled to a suitable grounded source of coating material. Port 70 is coupled to a suitable coating material dispenser 128. The two input-output ports 68, 72 of valve 88 are coupled to the two input/output ports of a double acting cylinder reservoir operated in a known manner. A rotary actuator coupled to shaft 62 is actuated to drive valve body 50 between its position coupling ports 66, 68 through passageway 116 and ports 72, 70 through passageway 118 and its position coupling ports 66, 72 through passageway 118 and ports 68, 70 through passageway 116. The actuator may be controlled by, for example, a three position, center-exhaust valve. A center exhaust valve permits the actuator to be emptied of drive air at the end of each quarter turn rotation of valve body 50. This substantially increases the speed with which the valve 88 operates to switch between its two positions just discussed. This increased speed of operation translates into a lower current pulse peak and a narrower current pulse width of the current pulse flowing between the high magnitude potential supply coupled to the coating material dispenser and ground through valve 88 and a series resistor having a value of, for example, 500 MΩ–1 GΩ.

What is claimed is:

1. A valve having a housing and a component movable within the housing, the housing having first, second and third ports formed in it, the movable component having a first passageway formed in it, movement of the movable component within the housing selectively connecting the first port through the first passageway to the second port, the movable component being selectively movable to disconnect the first port and second port and to connect the second port through the first passageway to the third port, a first end of the first passageway terminating adjacent an outer surface of the movable component within a first relief, and a first member for insertion in the first relief, the first member being constructed at least partly from semiconductive material and including a passageway therethrough providing communication between the first end of the first passageway and the outer surface of the movable component.

2. The apparatus of claim 1 wherein a second end of the first passageway terminates adjacent an outer surface of the movable component within a second relief, and further including a second member for insertion in the second relief, the second member being constructed at least partly from semiconductive material and including a passageway therethrough providing communication between the second end of the first passageway and the outer surface of the movable component.

3. The apparatus of claim 2 wherein the housing further includes a fourth port, and the movable component further includes a second passageway, movement of the movable component within the housing alternately connecting the first port and the second port through the first passageway and the third port and the fourth port through the second passageway, and the first port and the fourth port through the second passageway and the second port and the third port through the first passageway, a first end of the third passageway terminating adjacent an outer surface of the movable component within a third relief, and a third member for insertion in the third relief, the third member being constructed at least partly from semiconductive material and including a passageway therethrough providing communication between the first end of the third passageway and the outer surface of the movable component.

4. The apparatus of claim 3 wherein a second end of the second passageway terminates adjacent an outer surface of the movable component within a fourth relief, and further including a fourth member for insertion in the fourth relief, the fourth member being constructed at least partly from semiconductive material and including a passageway therethrough providing communication between the second end of the second passageway and the outer surface of the movable component.

5. The apparatus of claim 1 wherein the housing further includes a fourth port, and the movable component further includes a second passageway, movement of the movable component within the housing alternately connecting the first port and the second port through the first passageway and the third port and the fourth port through the second passageway, and the first port and the fourth port through the second passageway and the second port and the third port through the first passageway, a first end of the second passageway terminating adjacent an outer surface of the movable component within a second relief, and a second member for insertion in the second relief, the second member being constructed at least partly from semiconductive material and including a passageway therethrough providing communication between the first end of the second passageway and the outer surface of the movable component.

6. The apparatus of claim 3, 4 or 5 further including a third passageway defined between the housing and the movable component, the housing including fifth and sixth ports connected to the third passageway.

7. The apparatus of claim 1 or 2 further including a second passageway defined between the housing and the movable component, the housing including fourth and fifth ports connected to the second passageway.

8. A valve having a housing and a component movable within the housing, the housing having first, second and third ports formed in it, the movable component having a first passageway formed in it, movement of the movable component within the housing selectively connecting the first port through the first passageway to the second port, the movable component being selectively movable to disconnect the first port and second port and to connect the second port through the first passageway to the third port, at least one of the first and second ports including a first member for contacting the movable valve component and a second member for retaining the first member, at least one of the first and second members being constructed at least in part from a semiconductive material, each of the first and second members including a passageway providing communication between the at least one of the first and second ports and the movable valve component.

9. The apparatus of claim 8 wherein each of the first and second ports includes a first member for contacting the movable valve component and a second member for retaining the first member, at least one of the first and second members at each of the first and second ports being constructed at least in part from a semiconductive material, each of the first and second members including a passageway providing communication between a respective one of the first and second ports and the movable valve component.

10. The apparatus of claim 8 wherein the housing further includes a fourth port, and the movable component further includes a second passageway, movement of the movable component within the housing alternately connecting the first port and the second port through the first passageway and the third port and the fourth port through the second passageway, and the first port and the fourth port through the second passageway and the second port and the third port through the first passageway, one of the third and fourth ports also including a first member for contacting the movable valve component and a second member for retaining the first member, at least one of the first and second members associated with said one of the third and fourth ports being constructed at least in part from a semiconductive material, each of the first and second members associated with said one of the third and fourth ports including a passageway providing communication between said one of the third and fourth ports and the movable valve component.

11. The apparatus of claim 10 wherein each of the first, second, third and fourth ports includes a first member for contacting the movable valve component and a second member for retaining the first member, at least one of the first and second members associated with each of the first, second, third and fourth ports being constructed at least in part from a semiconductive material, and each of the first and second members including a passageway providing communication between a respective one of the first, second, third and fourth ports and the movable valve component.

12. The apparatus of claim 8 or 9 wherein a first region of the movable component surrounding a first end of the first passageway is constructed from semiconductive material.

13. The apparatus of claim 12 wherein a second region of the movable component surrounding a second end of the first passageway is constructed from semiconductive material.

14. The apparatus of claim 12 wherein the housing further includes a fourth port and the movable component further includes a second passageway, movement of the movable component within the housing alternately connecting the first port and the second port through the first passageway and the third port and the fourth port through the second passageway, and the first port and the fourth port through the second passageway and the second port and the third port through the first passageway, a second region of the movable component surrounding a first end of the second passageway being constructed from semiconductive material.

15. The apparatus of claim 13 wherein the housing further includes a fourth port and the movable component further includes a second passageway, movement of the movable component within the housing alternately connecting the first port and the second port through the first passageway and the third port and the fourth port through the second passageway, and the first port and the fourth port through the second passageway and the second port and the third port through the first passageway, a third region of the movable component surrounding a first end of the second passageway being constructed from semiconductive material.

16. The apparatus of claim 14 wherein a third region of the movable component surrounding a second end of the first passageway is constructed from semiconductive material.

17. The apparatus of claim 15 wherein a fourth region of the movable component surrounding a second end of the second passageway is constructed from semiconductive material.

18. The apparatus of claim 14 and further including a third passageway defined between the housing and the movable component, the housing including fifth and sixth ports connected to the third passageway.

19. The apparatus of claim 15 and further including a third passageway defined between the housing and the movable component, the housing including fifth and sixth ports connected to the third passageway.

20. The apparatus of claim 16 and further including a third passageway defined between the housing and the movable component, the housing including fifth and sixth ports connected to the third passageway.

21. The apparatus of claim 17 and further including a third passageway defined between the housing and the movable component, the housing including fifth and sixth ports connected to the third passageway.

22. The apparatus of claim 8 or 9 further including a second passageway defined between the housing and the movable component, the housing including fourth and fifth ports connected to the second passageway.

23. A valve including a housing and a component movable within the housing, the housing having first, second and third ports formed in it, the movable component having a first passageway formed in it, movement of the movable component within the housing selectively connecting the first port through the first passageway to the second port, at least a first region of the movable component surrounding at least a first end of the first passageway being constructed from semiconductive material, the movable component being selectively movable to disconnect the first port and second port and to connect the second port through the first passageway to the third port.

24. The apparatus of claim 23 wherein a second region of the movable component surrounding a second end of the first passageway is constructed from semiconductive material.

25. The apparatus of claim 24 wherein the housing further includes a fourth port and the movable component further includes a second passageway formed in it, movement of the movable component within the housing selectively connecting the first port through the first passageway to the second port and the third port through the second passageway to the fourth port, or the first port through the first passageway to the fourth port and the second port through the second passageway to the third port, at least a third region of the movable component surrounding at least a first end of the second passageway also being constructed from semiconductive material.

26. The apparatus of claim 25 wherein at least a fourth region of the movable component surrounding a second end of the second passageway is also constructed from semiconductive material.

27. The apparatus of claim 23 wherein the housing further includes a fourth port and the movable component further includes a second passageway formed in it, movement of the movable component within the housing selectively connecting the first port through the first passageway to the second port and the third port through the second passageway to the fourth port, or the first port through the first passageway to the fourth port and the second port through the second passageway to the third port, at least a second region of the movable component surrounding at least a first end of the second passageway also being constructed from semiconductive material.

28. The apparatus of claim 23, 24, 25, 26 or 27 wherein the movable component is constructed from semiconductive material.

* * * * *